United States Patent [19]

Huet et al.

[11] 4,178,563

[45] Dec. 11, 1979

[54] SYSTEM FOR GENERATING A HIGH-ENERGY ELECTRICAL SIGNAL THROUGH A BRIEF TIME, AND A LASER COMPRISING SUCH A SYSTEM

[75] Inventors: Philippe Huet, Gif-sur-Yvette; Roger H. Milléon, Levis-Saint-Nom; Philippe Leprince, Gif-sur-Yvette, all of France

[73] Assignee: Agence Nationale de Valorisation de la Recherche (ANVAR), Neuilly-sur-Seine, France

[21] Appl. No.: 740,217

[22] Filed: Nov. 9, 1976

[30] Foreign Application Priority Data

Nov. 17, 1975 [FR] France ............................ 75 35084

[51] Int. Cl.² ........................................ H01S 3/097
[52] U.S. Cl. ........................................ 331/94.5 PE
[58] Field of Search ............... 331/94.5 PE; 330/4.3; 315/108

[56] References Cited

U.S. PATENT DOCUMENTS

| 3,571,745 | 3/1971 | Altman et al. | 331/94.5 PE |
| 3,879,681 | 4/1975 | Godard et al. | 331/94.5 PE |
| 4,039,971 | 8/1977 | Wang et al. | 331/94.5 PE |

OTHER PUBLICATIONS

Loy et al., *IBM Technical Disclosure Bulletin*, vol. 18, No. 3, Aug. 1975, pp. 950–951.

*Primary Examiner*—William L. Sikes

[57] ABSTRACT

A system for generating an electrical signal of energy equal to at least 0.5 joule for a time equal to 100 ns. This system comprises capacitor means of the discrete type for energy storage and adapted to be charged to a high voltage and a discharge circuit for said capacitor means comprising in series an electronic switch for controlling the discharge and energy transfer means comprising a first and second output terminals normally intended to be connected to the respective opposite terminals of a load. The energy transfer means comprise flat line means. The first and second metal coatings of these flat line means are connected respectively to the first and second output terminals.

12 Claims, 8 Drawing Figures

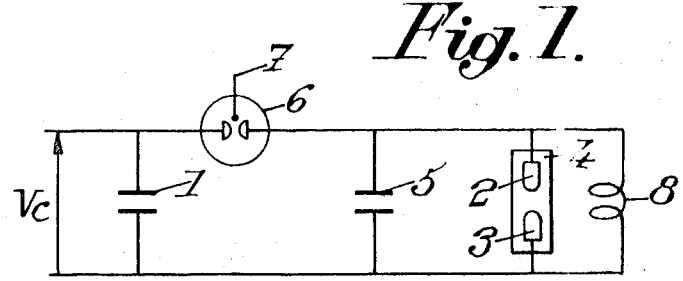
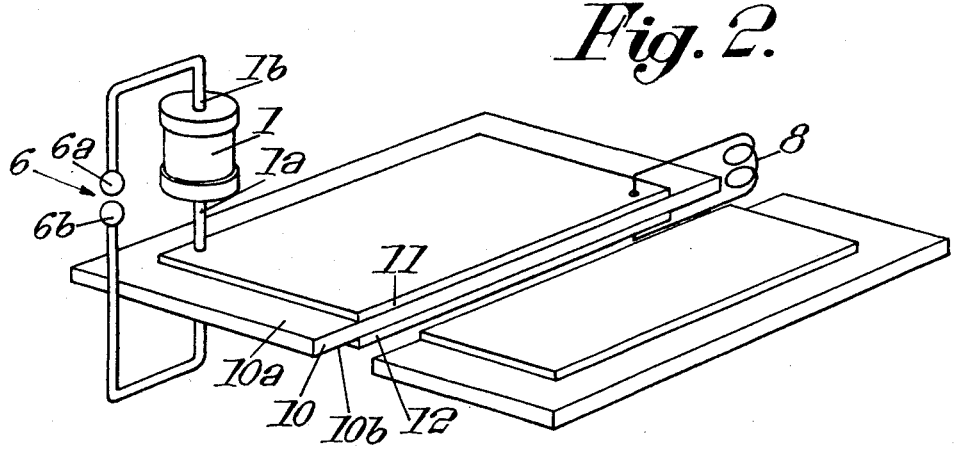
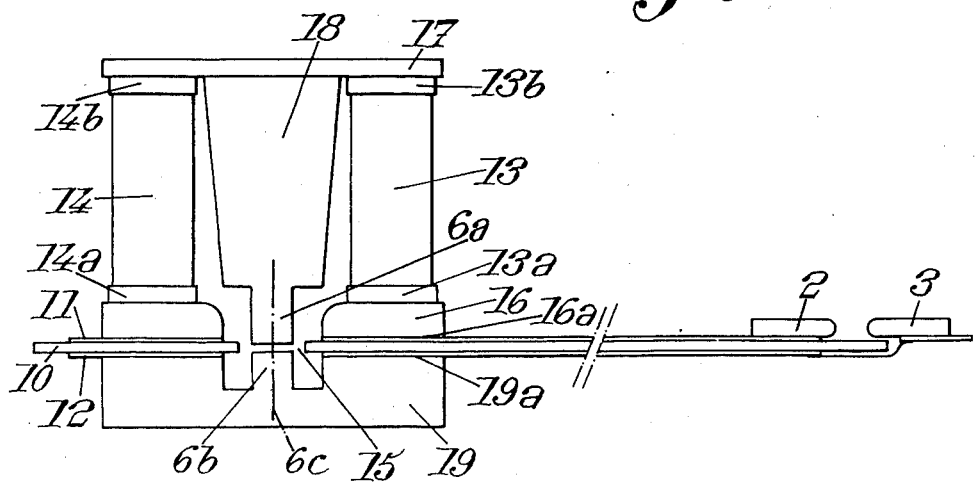

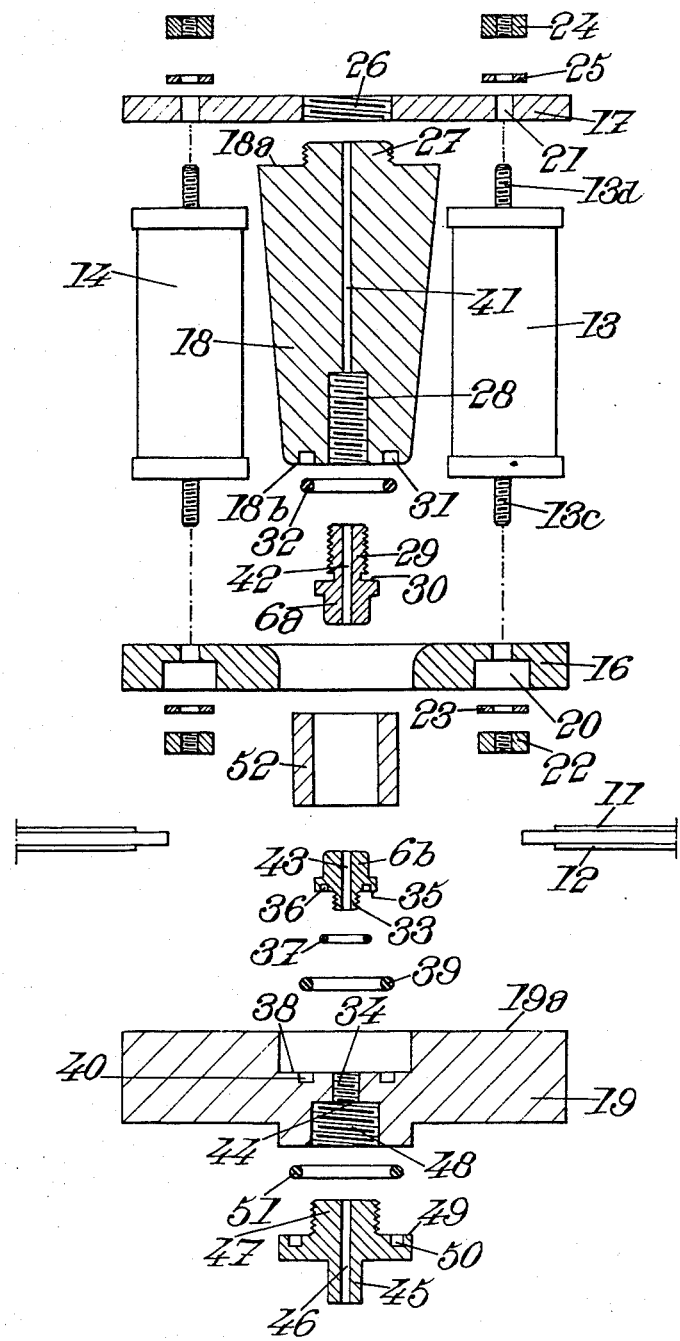

SYSTEM FOR GENERATING A HIGH-ENERGY ELECTRICAL SIGNAL THROUGH A BRIEF TIME, AND A LASER COMPRISING SUCH A SYSTEM

This invention relates to a system of generating a high-energy electrical signal for a brief time, equal to 100 nanoseconds (ns) maximum. It relates more specifically to a generator system of this kind adapted to produce a signal, the energy of which is at least equal to 0.5 joule. The invention also relates to a molecular gas laser, more particularly a molecular nitrogen laser, comprising a generator system of this kind as excitation source.

It is well known that molecular nitrogen lasers generally comprise two elongate electrodes of a length generally more than 30 cm, the facing surfaces of which are parallel. The elongate electrodes are disposed in a chamber containing nitrogen. Such lasers also comprise an excitation system which delivers to the elongate electrodes an energy of the order of several joules for a very short time of the order of a few tens of nanoseconds. This energy is in the form of a high-voltage electrical signal, generally of several kilovolts (kV).

An excitation system of this kind is already known (for example from an article published in "Applied Physics Letters" July 1, 1956, volume 7, number 1, pp. 4 to 6, entitled "Saturation of the molecular nitrogen second positive laser transition") for nitrogen lasers, comprising energy storage capacitors charged to a high voltage by a high-voltage generator and a circuit for discharging these storage capacitors. This discharge circuit is disposed at the terminals of the storage capacitor and comprises in series: an electronic switch, e.g. a spark gap, and coaxial cables for transferring energy to the electrodes for transverse excitation of the nitrogen. In this known system, the electrodes are segmental and each coaxial cable feeds an electrode segment. An excitation system of this kind is of a disturbing size, particularly because of the large number of coaxial cables. Also, it is of complex mechanical construction because of the segmentation of the electrodes.

Another excitation system is known (from an article by Bruno GODARD entitled "A simple high-power large efficiency $N_2$ ultraviolet laser" published in the "IEEE Journal of Quantum Electronics", Volume QE 10, No. 2, Feb. 74) comprising essentially a flat line formed by an insulating sheet on each side of which a copper film is deposited. An elongate strip of the copper film is removed from at least one side of this insulating sheet. This film is therefore separated respectively in a first and second part from either side of the elongate strip. The electrodes of the laser cavity are connected respectively to these first and second parts. An electronic switch is disposed between the said first copper film part and the copper film on the opposite surface of the insulating sheet. Finally, the high-voltage generator is disposed between the said first copper film part and the copper film disposed on the opposite side of the insulating sheet. In this way the energy storage and its transfer to the electrodes are effected by a single element.

With a flat line excitation system of this kind it is necessary—to enable a sufficiently high energy to be stored and for the transmission line impedance not to have an excessive value (the losses being a function of such impedance)—that the thickness of the insulating sheet should be small. The reason for this is that the capacity of the storage capacitor is inversely proportional to the thickness of the insulating sheet (the stored energy is directly proportional to the said capacity) and the transmission line impedance is in turn proportional to said thickness. However, the thickness of the insulating sheet should not be too small because it must withstand the supply voltage and it is well-known that if the thickness is too small the risks of breakdown are appreciable since the flat line is constantly under voltage. Thus for an insulating sheet of a thickness of 50 microns with a "kapton" or "mylar" dielectric the storage capacitor has at maximum a capacity of 0.32 $\mu$F/m2; with a supply voltage of 5 kV maximum the energy is then a maximum of 4 joules/m2. Finally, to store a sufficiently high energy the flat line must have a large area. Since the storage capacitor and the transmission line are made in a single element, any modification of the excitation system (either voluntarily or occasioned by repairs) makes it necessary to dismantle the excitation system unit. Finally, removal of the copper film over an elongate strip on one side of the insulating sheet is a complex operation; similarly, it is difficult to make the connections between the first and second copper film parts on the one hand, on one side of the insulating sheet, and the excitation electrodes on the other hand.

The object of the invention is therefore to provide a system for generating an electrical signal of an energy of at least 0.5 joule for a maximum time of 100 ns of use more particularly for exciting a molecular gas laser, such as a molecular nitrogen laser, such system being adapted to deliver a high energy with a small size.

Another object of the invention is to provide a system of this kind which is highly reliable and easy to service.

Yet another object of the invention is to provide a system for exciting a molecular gas laser, such as a nitrogen gas laser, to give a high-energy stimulated beam of light.

Yet another object of the invention, finally, is to provide an excitation system of this kind which can simultaneously feef a number of loads such as the excitation electrodes of a number of molecular nitrogen lasers.

The generator system according to the invention is therefore of the type comprising capacitor means of the discrete type for energy storage and adapted to be charged to a high voltage, and a discharge circuit for said capacitor means comprising in series, firstly, an electronic switch for controlling the discharge and, secondly, energy transfer means comprising a first and second output terminal normally intended to be connected to the respective opposite terminals of the load for using the signal. According to the invention this system is characterised in that the energy transfer means comprise flat line means comprising an insulating sheet and, on each side of this sheet, a metal coating to which a respective output terminal is connected.

The result is a generator system which can both store a high energy and has a reduced size and satisfactory reliability. It is advantageous for the thickness of the insulating sheet to be between 3 microns and 5 millimeters, preferably between 50 and 100 microns.

In one embodiment of the invention, the electronic switch comprises a spark gap. Preferably, in that case, the insulating sheet is formed with an aperture and the energy storage capacitor means are formed by an array of parallel capacitors (advantageously all identical), said capacitors being disposed around the said aperture and being connected, by their first plates, to a first metal base in the form of a ring having a contact surface adapted to be disposed on a first side of the insulating sheet on the corresponding metal coating and in such manner that the axis of its central aperture corresponds to the axis of the aperture of the insulating sheet, the second plates of said capacitors being connected to a second metal base, the array of capacitors and the first and second bases being disposed on the said first side of the insulating sheet, and on the second side of said insulating sheet the system comprises a third metal base having a contact surface adapted to be disposed on the metal coating on the second side of the insulating sheet around the aperture of said sheet, the first and second electrodes of the spark gap being connected respectively to the second and third metal bases so that the longitudinal axis of the electrodes of the spark gap corresponds substantially to the axis of the aperture of the insulating sheet. In an arrangement of this kind the energy losses are even smaller.

The invention also relates to a laser of the molecular gas type, such as nitrogen, comprising an excitation system formed by a generator system of the above type.

Preferably, a laser of this kind comprises a first and second laser channels disposed in series so that the optical signal delivered by the first laser channel can excite the second channel. In that case, a first and second generator system of the type described above are provided respectively for exciting the first and second laser channels, and means for synchronising the triggering of the electronic switches of the first and second generating systems, said synchronization means comprising means for detecting the electric current flowing in the electronic switch of the first generator system and delay means disposed between said detection means and a control electrode of the electronic switch of the second generator system. In this way a high energy beam of light is obtained, the unit comprising the second laser channel and the second excitation system forming, as it were, an amplifier for the light signal delivered by the first laser channel.

Other characteristics, objects and advantages of the invention will be clearer from the following description of the preferred embodiments of the invention, this description being given with reference to the accompanying drawings wherein:

FIGS. 1 and 2 diagrammatically illustrate the principle of the system according to the invention.

FIG. 3 is a diagram showing an embodiment of the circuit shown in FIGS. 1 and 2.

FIG. 4 is an exploded view in greater detail of part of the system shown in FIG. 3.

FIG. 1 is a diagram showing the principle of the generator system according to the invention in its preferred application, i.e. the excitation of a molecular nitrogen laser.

Figure 5:
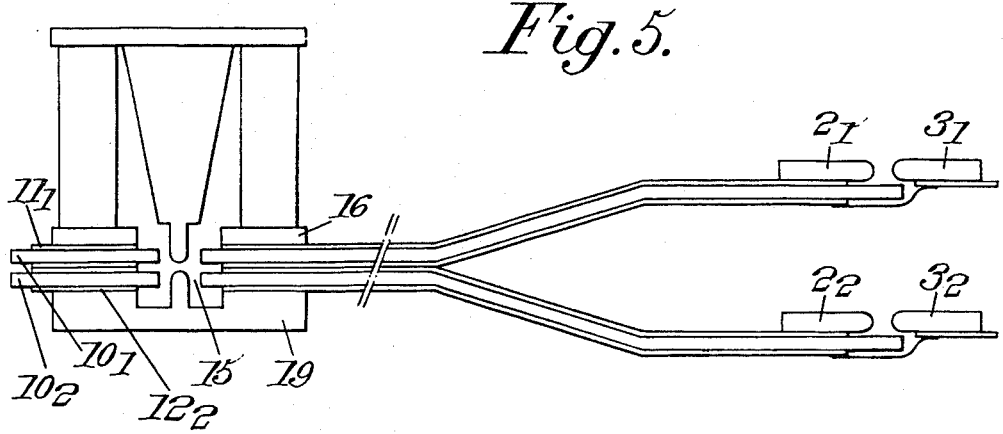
FIG. 5 is a variant of the circuit shown in FIG. 3.

As shown in FIG. 1, the generator system comprises, firstly, an energy storage capacitor 1 charged at a voltage $V_c$ of the order of several kilovolts by a high-tension generator (not shown in FIG. 1). The energy stored by the capacitor 1 is intended for transmission to a load in the form of the excitation electrodes 2 and 3 of a laser channel 4 containing molecular nitrogen. This energy is transmitted to the electrodes 2 and 3 via a transmission line 5 which is represented by a capacitor in FIG. 1. The transfer of the energy stored in capacitor 1 to line 5, i.e. to the load, is controlled by means of an electronic switch 6 which in this example comprises a spark gap with a control electrode 7. Of course any other electronic switch may be used, e.g. a thyratron.

Referring to FIG. 1, the spark gap 6 and the line 5 (or connecting capacitor) form a series unit which is disposed at the terminals of the storage capacitor 1 FIG. 1 also shows that the load (electrodes 2 and 3) is disposed in parallel with line 5.

Finally, referring to FIG. 1, a load inductance 8 is provided at the terminals of line 5. The only object of this inductance 8 is to short-circuit line 5 when spark gap 6 is not conductive, i.e. when the capacitor 1 is charged up. This inductance is not obstructive during the energy transfer period because at that time it has an impedance of a value substantially greater than that between the terminals 2 and 3. This latter impedance drops very rapidly (in a time of less than 1 ns) to a very low value of about 0.1 Ohm.

According to the invention, and as shown more clearly in FIG. 2, line 5 is a flat line formed by an insulating sheet 10, each of the sides of which, (10a and 10b respectively) is covered by a metal film of copper in this example, 11 and 12 respectively.

Referring to FIG. 3, the electrodes 2 and 3 are connected to the copper layers 11 and 12 respectively.

It will be apparent at this stage that the use of a flat line in a circuit of the type shown in FIG. 1 has numerous advantages. First of all, unlike conventional flat line circuits in which a line of this kind is used both as an energy storage means and as a means of transferring such energy, there is no need to remove a strip of the copper coating from one side; with the circuit according to the invention, the electrodes, as already stated above, are connected to the coatings 11 and 12 on opposite sides. Also, the line 5 formed by the insulating sheet 10 and its coating 11 and 12 is not permanently subjected to high tension; in these conditions, the risk of insulation breakdown is reduced, particularly since in the application concerned (nitrogen laser) the pulses transmitted by said line 5 have extremely short times, a few tens of nanoseconds maximum. It should also be noted that the maximum d.c. voltage which can appear at the terminals of line 5 has the following value:

$$V = E_o \frac{C_s}{C_L + C_s} = E_o \frac{1}{1 + \frac{C_L}{C_s}}$$

In this formula, $E_o$ is the value of the high tension delivered by the generator and $C_s$ and $C_L$ respectively denote the capacity of the capacitor 1 and the capacity of the capacitor formed by the line 5. Generally, line 5 has a capacity $C_L$ greater than the capacity $C_s$ of the storage capacitor 1; consequently, the voltage v at the terminals of line 5 is equal at maximum to half the voltage $E_o$. The risk of breakdown is therefore further reduced.

It will also be apparent that replacement of the line 5 is an easy operation and there is no need for this line to have a large area.

In the circuit shown in FIG. 2, a terminal or plate 1a of capacitor 1 is connected to the copper coating 2. The second terminal or plate 1b of capacitor 1 is connected to the first electrode 6a of the spark gap 6. The second electrode 6b of this spark gap 6 is connected to the copper coating 12. Finally, in the example, inductance 8 is disposed between the coatings 11 and 12.

An advantageous embodiment of the generator system according to the invention, the principle of which has just been explained (FIG. 1 and 2), will now be described with reference to FIGS. 3 and 4.

In this embodiment, capacitor 1 is formed by a certain number (eight in the example) of capacitors (only two capacitors 13 and 14 are shown in parallel and the insulating sheet 10 covered with the metal coatings 11 and 12 is formed with an aperture 15 around which the said capacitors 13, 14 are distributed.

The electrodes 6a and 6b of the spark gap are disposed along the axis of this aperture 15 so that the longitudinal axis 6c of this spark gap coincides with the said axis of aperture 15. The capacitors 13, 14 are identical as regards value and external shape and are distributed uniformly about the axis of aperture 15.

The first plates 13a, 14a etc. of capacitors 13, 14 etc. are interconnected by a metal ring 16 having a plane surface 16a disposed on the metal coating 11. In the example, the inside diameter of the aperture of this ring 16 is greater than that of the aperture 15 and the axis of this ring coincides with the said axis of the aperture 15. The object of this arrangement is to avoid breakdown due to by-passing of the dielectric 10.

The second plates 13b, 14b of the capacitors 13, 14 etc. are interconnected by a metal plate 17. Electrode 6a is connected to this plate 17 via a metal element 18, which is of conical shape in the example, and the axis of which also coincides with that of the aperture 15.

Electrode 6b is connected to a metal base 19 which has a plane face 19a which is brought into contact with the metal coating 12 of the insulating sheet 10 around the aperture 15.

As will be seen from FIG. 3, the space between the facing surfaces of the electrodes 6a and 6b is substantially at the level of aperture 15.

As already stated, electrode 2 is electrically connected to coating 11 and electrode 3 is connected to coating 12.

The system made up of the capacitors 13, 14 etc. and the spark gap 6 has a symmetrical structure about the axis of the aperture 15. This structure is of reduced size. This geometry also enables the losses to be reduced because it has a low inductance and a low parasitic capacity and a path of the current lines is reduced. This system can also be readily assembled and dismantled; consequently, the discrete capacitors 13, 14 etc. can readily be replaced and/or such capacitors be added or removed. Finally, the distance between the electrodes 6a and 6b of the spark gap 6 can be easily varied, particularly when the value of the high-tension is modified. It will also be seen that the ring 16 and the plate 17 has a twofold function, i.e., to establish the electrical connections and to form mechanical supports for the capacitors 13, 14 etc.

As will be apparent from FIG. 4, each capacitor (13, 14) is of cylindrical shape and its end sections are continued by screwthreaded rods 13c and 13d having the same axis as the cylindrical body of this capacitor; the rods 13c and 13d are of course respectively in contact with the plates 13a and 13b. These screwthreaded rods enable the capacitors to be secured to the ring 16 on the one hand and to the plate 17 on the other hand. Ring 16 is formed with apertures 20 to allow the passage of these screwthreaded rods 13c; similarly, plate 17 is formed with apertures 21 through which the rods 13d can pass. The rods 13c are fixed to the ring 16 by nuts 22 and washers 23. Similarly, the screwthreaded rods 13d are fixed to the plate 17 by nuts 24 and washers 25.

To fix member 18 to plate 17, the latter has a tapped central aperture 26 and the end 18a of this conical member 18 is continued by a screwthreaded part 27 adapted to cooperate with the tapped aperture 26.

To fix the electrode 6a of the spark gap to the member 18, the side 18b (remote from side 18a) of member 18 is formed with a tapped aperture 28 in the member 18 and electrode 6a is continued by a screwthreaded part 29 adapted to cooperate with the tapped hole 28.

Before the screwthreaded part 29 electrode 6a terminates in a shoulder 30 remote from its operative surface. Surface 18b of member 18 has a groove 31 adapted to contain a gasket 32 normally interposed between an end face of a sleeve 52 and the surface 18b.

Electrode 6b is continued by a screwthreaded part 33 again remote from its operative surface. Like member 18, base 19 has a tapped aperture 34 adapted to cooperate with the screwthreaded part 33 to fix the electrode 6b on the base 19. Between the screwthreaded part 33 and the electrode 6b a shoulder 35 is provided with a groove 36 adapted to contain a gasket 37 providing a seal between the shoulder 35 and a surface 38 of the base 19. A gasket 39 and the groove 40 are also provided in surface 38. Gasket 39 normally bears against the other end face (the bottom one in FIG. 3) of the sleeve 52 to allow the passage of a gas in the space between the electrodes 6a and 6b, the member 18, the electrodes 6a and 6b and the base 19 having central ducts 41–44 respectively. In the example, these ducts are disposed on the axis of the said parts. A flow of gas in this way increases the stability of the current passed by the spark gap 6. Also, this flow of gas allows the electrodes to be cooled. Of course the gaskets 32, 37 and 39 prevent lateral leakage of this gas.

To bring the gas into the space between the electrodes 6a and 6b, a spigot 45 is provided, which is formed with a central duct 46 and is continued by a screwthreaded part 47 cooperating with a tapped hole 48 in the base 19. Of course, a shoulder 49 having a groove 50 to contain a gasket 51 is provided between the screwthreaded part 47 and the spigot 45.

Finally, referring to FIG. 4, the insulating sleeve 52 is made from the material "Teflon" and is adapted to surround the electrodes 6a and 6b and the intervening space. This sleeve forms a silencer which is intended largely to reduce the noise produced by making the spark gap 6 conduct and is intended to pressurise the spark gap to stabilise the spark. As will be seen hereinafter, sleeve 52 is also intended to support a winding (not shown in FIG. 4) for measuring the current flowing through the spark gap.

In the example shown in FIGS. 3 and 4, no control electrode 7 is provided for the spark gap 6, but in a variant such an electrode may be used.

In a specific embodiment of this excitation system (FIGS. 3 and 4), capacitor 1 comprises eight capacitors each having a capacity of 0.012 $\mu$F. Each of these capacitors is of the type made by L.C.C.-C.I.C.E. Company under reference KIV 416. These capacitors have a very steep rise time and their self-inductance is low, being 20 nH maximum. In this same embodiment, the flat line has a capacity of 0.145 $\mu$F. This line comprises an insulating sheet 10 of "kapton" of a thickness of 75μ and copper coatings 11, 12 stuck to the surfaces 10a, 10b of a thickness of 35μ. This sheet is in the form of a rectangle 90 cm long and 45 cm wide. The storage capacitor supply voltage is 10 kV and the nitrogen pressure in the laser cavity is about 60 Torr. In these conditions, the energy of the laser beam is 6 millijoules, and the light pulse duration is 8 nanoseconds at mid-height. The efficiency, i.e. the ratio between the laser beam energy and the energy stored in the storage capacitor was 1.3%.

Of course, the invention is not limited to these values selected for the storage capacitor capacity. More particularly, the capacity may be much greater. The stored energy may be of an appreciable value which may be in excess of 100 joules.

In the above embodiment, the electrodes 2 and 3 of elongate shape are formed by elongate metal plates separated in longitudinal slots (not shown) by disposing an insulant on the facing surfaces of the electrodes. This insulant consists of an ordinary adhesive tape. Thus, the divergence of the resulting laser beam is substantially less than with electrodes in which such slots are not provided.

Figure 6:
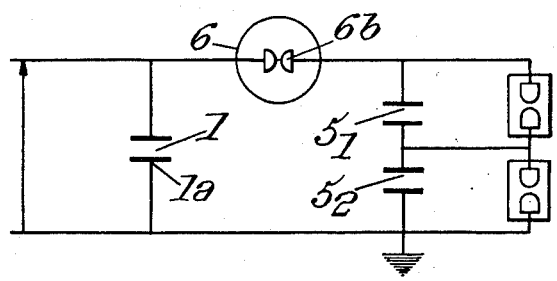
FIG. 6 is a diagram corresponding to the circuit shown in FIG. 5.

As shown in FIGS. 5 and 6, the circuit described hereinbefore in connection with FIGS. 3 and 4 may be used, with slight modifications, to excite a number of molecular nitrogen lasers simultaneously. To this end, just a single storage capacitor and spark-gap unit is provided. The modifications mentioned comprise stacking a number of insulating sheets covered with copper coatings. In the example, the number of such insulating sheets in two but of course there could be more.

Each of the insulating sheets covered with metal coatings is formed with an aperture corresponding to aperture 15 in FIG. 3. Ring 16 is in contact with coating $11_1$, of the first sheet $10_1$ and base 19 is in contact with the metal coating $12_2$ of the last insulating sheet $10_2$.

At a given point the sheets are separated so as to allow their metallised surfaces to be connected with the corresponding electrodes $2_1$, $3_1$ and $2_2$, $3_2$ of the separate lasers.

As shown in FIG. 6, the lines $5_1$ and $5_2$ form a series unit, the first terminal of which is connected to electrode 6b of spark gap 6 and the other terminal of which is connected to plate 1a of capacitor 1.

With the circuit described above with reference to FIGS. 5 and 6, laser signals can be obtained which are perfectly synchronised in time or whose time shifts have a given value depending essentially on the pressure of the gas in each laser channel.

A two-channel laser (60 and 61 respectively) will now be described with reference to FIG. 7, which allows a high-power beam of light to be obtained.

Each channel is associated with an excitation system 62, 63 respectively of the kind described with reference to FIGS. 3 and 4. In FIG. 7, the system comprising the discrete capacitors, the bases and the spark gap is denoted by a solid-line circle (62a and 63a); sheet 10 is shown by an ordinary rectangle (62b and 63b).

The two channels 60, 61 are so disposed that the laser beam 64 produced by channel 60 reaches channel 61 so that beam 64 can be used as optical excitation in channel 61. To this end, the laser channels simply have to have properly aligned axes; optical adjustment is necessary but can be readily carried out by means of an alignment device 86 of the telescope type. Device 86 also allows the beam leaving channel 60 to be focussed.

Figure 7:
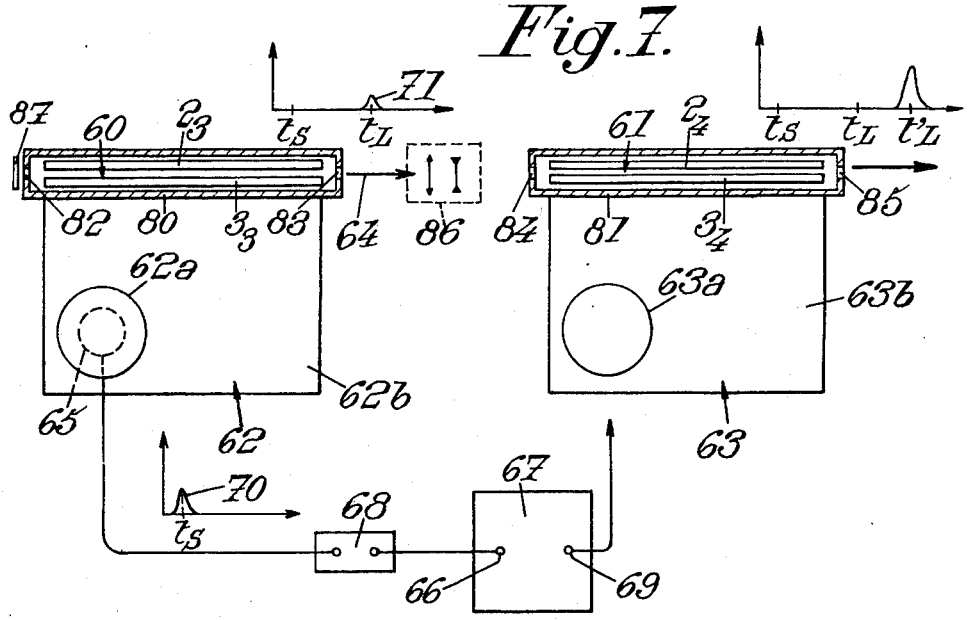
FIG. 7 is a diagram showing a laser according to the invention comprising two generator systems of the type shown in FIG. 1, and FIG. 8 partially illustrates a laser according to the invention.

As shown in FIG. 7, each channel comprises an elongate enclosure 80, 81 inside which are disposed electrodes $2_3$, $3_3$, and $2_4$, $3_4$ respectively. Enclosures 80 and 81 are closed at their ends by quartz windows 82, 83 and 84, 85. The optical device 86 is installed between the windows 83 and 84 to concentrate the beam leaving channel 60 towards the inlet of channel 61. Finally, a mirror 87 is disposed at the rear of the window 82 of the first channel.

Operation of the excitation systems 62, 63 is synchronized as follows. First of all, a winding 65, shown diagrammatically by broken-line circle in FIG. 7, of a probe of the internal flow type of the kind described in U.S. Pat. No. 3,885,213 is first disposed around the insulating sleeve (52 in FIG. 4) of the excitation system 62. A probe of this kind is characterised essentially in that its winding has an appreciable resistance.

The signal delivered by winding 65 is transmitted to the input 66 of a pulse generator 67 via a delay network 68. Output 69 of generator 67 is connected to the spark gap (or thyratron) trigger electrode of the excitation system 63.

A circuit of this kind allows the operation of the two laser channels 60 and 61 to be synchronised. The inventors have found from experiments carried out within the framework of the invention that the time shift $t_1$-$t_s$ between the appearance of a pulse 70 at the terminals of winding 65 and the appearance of the laser pulse 71 was of a constant value of the order of 40 to 100 ns. This shift depends essentially only on the pressure of gas in the laser channel.

Thus in the second laser channel 61 it is possible, by the synchronisation means comprising the delay network 68 and the generator 67, to obtain simultaneously optical excitation—by the laser signal 64 delivered by the first channel 60—and electrical excitation delivered by the generator 63. In these conditions, the unit formed by the second laser channel 61 and its excitation system 63 may be considered as being an amplifier for the light emitted by the laser unit formed by the first channel 60 and its excitation system 62.

Figure 8:
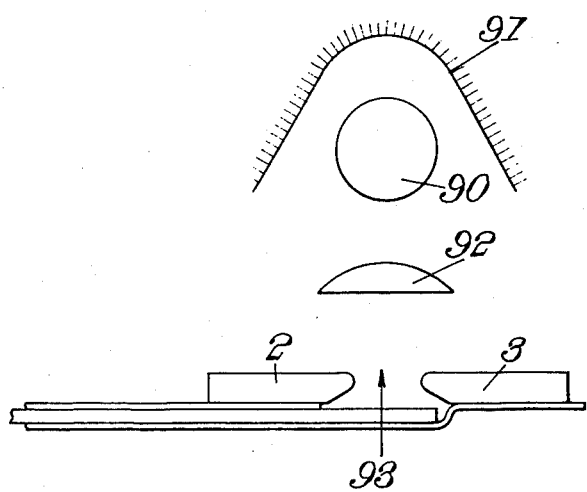

In the embodiment of the invention described in connection with FIG. 7, the winding 65 disposed around the sleeve 52 (FIG. 4) surrounding the spark gap electrodes, is intended to trigger a second laser channel. The signal delivered by this winding 65 may also be used to pre-ionize the nitrogen in the laser channel. Such pre-ionization enables an initial electron density to be obtained before the discharge so that the time for forming the active plasma between the electrodes can be reduced. To this end it is possible, for example, to add the nitrogen another gas whose ionization potential is low, e.g. sulphur hexafluoride $SF_6$. Pre-ionization is then effected by applying a beam of light for a very short time (flash) between the electrodes in the laser channel. FIG. 8 diagrammatically illustrates this arrangement. As shown in this Figure, a flash system is disposed above the gap between the electrodes 2 and 3. The flash system comprises a cylindrical lamp 90 of elongate shape, a reflector 91 adapted to focus on a lens element 92 the beam of light produced by lamp 90. Lens element 92 is intended to direct the beam of light towards the space 93 between the electrodes 2 and 3. These various elements 90, 91, 92 preferably occupy substantially the same length as the electrodes and are disposed in the same channel.

Of course a system is provided (not shown) to trigger the lamp 90, which is controlled by the signal delivered by the winding 65.

As already stated, the main application of the generator system according to the invention is the excitation of a molecular nitrogen laser. With an excitation system of this kind, a laser can be produced having a high power of more than 500 kW with a large light pulse width of more than 5 ns, and these pulses retain identical characteristics even after a high number of such pulses has been produced. Finally, the reliability of this excitation system according to the invention is very high and the laser beam obtained has low divergence. It should also be noted that with the excitation system according to the invention laser pulses can be produced at a frequency of as much as several tens Hz.

It is well known that such molecular nitrogen lasers emit an ultra-violet radiation of wavelength 3371 Å. This laser radiation may be used to excite (by optical pumping) dye-laser having a continuous spectrum over a relatively wide wavelength band. It is thought that such dye-lasers can be used to separate uranium isotopes.

Other applications of the system according to the invention are for exciting other gases such as hydrogen, neon, a mixture of argon and nitrogen, and so on.

Finally, with regard to the system shown in FIGS. 5 and 6, the two laser beams produced can be used to excite simultaneously two dye-lasers over two different wavelengths. These two laser beams can also be focussed to excite a single dye-lasser.

It will be apparent from the foregoing, of course, that the invention is not limited to those applications and embodiments which have been discussed more specifically, and that, on the contrary, the invention covers all variants thereof.

We claim:

1. A system for generating and transferring to a load an electrical pulse signal of high energy and low duration, comprising a voltage source, capacitor means for the storage of high voltage energy connected across said voltage source, and interposed between said voltage source and said load, an electronic switch for controlling the discharge of said capacitor connected in series with a flat line energy transfer means comprising an insulating sheet having on each side thereof a metal coating provided with an output terminal, said output terminals being connected respectively across said load, said flat line transfer means having an aperture therethrough, and said high energy storage capacitor means comprising a plurality of capacitors of the discrete type, each having first and second plates, said capacitors being disposed on one side of said transfer means in a parallel array around the said aperture, a first metal contact ring disposed coaxially with said aperture in contact with said first plates and the metal coating on the one side of said transfer means and a second metal contact ring interconnecting said second plates, and a metal contact base disposed on the metal coating on the other side of the transfer means symmetrically around the aperture, and said electronic switch comprises a first and a second electrode spaced from each other to define a spark gap, the first and second electrodes being connected respectively to the second metal ring and said metal contact bases so that the longitudinal axis of the electrodes of the spark gap corresponds substantially to the axis of the aperture of the insulating sheet.

2. A system according to claim 1, in which the thickness of the insulating sheet is between 3 microns and 5 millimeters.

3. A system according to claim 1, in which the first and second electrodes of the electronic switch define an inner channel to allow the passage of a gas in the space therebetween.

4. A system according to claim 1, including an insulating sleeve surrounding the space between the first and second electrodes of the electronic switch.

5. A system according to claim 1, in which the energy transfer means comprise at least two insulating sheets covered on each side by a metal coating, at least a part of the surfaces of these sheets being stacked so as to form an array in series between, firstly, a terminal of the electronic switch and, secondly, a terminal of the storage capacitor means, the metal coatings of each insulating sheet having an output terminal for connection to a corresponding terminal of the load.

6. A system according to claim 1 in which the energy transfer means comprise at least two insulating sheets covered on each side by a metal coating, at least a part of the surfaces of these sheets being stacked so as to form an array in series between, firstly, a terminal of the electronic switch and, secondly, a terminal of the storage capacitor means, the metal coating of each insulating sheet having an output terminal for connection to a corresponding terminal of the load and each of said sheets being formed with an aperture, said sheets being stacked so that the axes of the apertures coincide with one another and with the axis of the electronic switch, the contact surface of the first metal contact ring being disposed on one side of the first sheet and the metal contact base being disposed on the correspondingly opposite side of the last sheet.

7. A system according to claim 1 wherein the load is formed by the excitation electrodes of a laser of the molecular gas type.

8. A laser of the molecular gas type comprising at least a pair of optical resonant cavities each having excitable electrodes and a gas medium defining at least first and second laser channels disposed in series so that the optical signal delivered by the first laser channel can excite the second laser channel, a first and a second generator system according to claim 1 for exciting the first and second laser channels, and means for synchronizing the triggering of the electronic switches of the first and second generating systems, said synchronization means comprising means for detecting the electric current flowing in the electronic switch of the first generator system and delay means interposed between said detection means and the control electrode of the electronic switch of the second generator system.

9. A laser according to claim 8, wherein the electronic switch of the first generator system comprises a spark gap and the detection means comprise a probe of the internal flow type, the winding of which is disposed around the said spark gap.

10. The system according to claim 1, wherein said capacitor and transfer means are arranged to provide a pulse signal equal to at least 0.5 joule for a time equal to 100 ns maximum.

11. The system according to claim 1, wherein said capacitors are arranged uniformly spaced from each other and symmetrically to the axis of the aperture.

12. The system according to claim 1, wherein said switch is normally open, and said capacitor means is connected to a source of current, whereby said capacitor may be charged without influence on said flat line transfer means.

* * * * *